United States Patent [19]

Boyle et al.

[11] 4,205,198
[45] May 27, 1980

[54] BUS STRUCTURE COMPRISING AN INSULATING SUPPORT AND A COATED ELECTRIC BUS BAR

[75] Inventors: Malachy V. Boyle, Narberth, Pa.; Mid Ouyang, Cherry Hill, N.J.

[73] Assignee: General Electric Company, Philadelphia, Pa.

[21] Appl. No.: 923,290

[22] Filed: Jul. 10, 1978

[51] Int. Cl.² ............................................. H01B 17/18
[52] U.S. Cl. ...................................... 174/171; 174/156
[58] Field of Search ..................... 174/68 B, 156, 157, 174/168, 169, 171

[56] References Cited

U.S. PATENT DOCUMENTS

| | | | |
|---|---|---|---|
| 3,519,733 | 7/1970 | Eichelberger et al. | 174/171 |
| 3,601,525 | 8/1971 | Oravec | 174/171 |

*Primary Examiner*—Laramie E. Askin
*Attorney, Agent, or Firm*—William Freedman

[57] ABSTRACT

This electric bus structure comprises a bus bar having a coating of insulating material, an insulator for supporting the bus bar, and a bracket of insulating material having a U-shaped cross-section mounted on the insulator and having a pair of spaced-apart arms between which the bus bar is positioned. The bus bar is clamped to the bracket by clamping means comprising a clamping member of insulating material extending between the arms. The bracket and the clamping member each have rib structure projecting toward the bus bar and providing the sole surfaces through which contact is made between said coating and the bracket and clamping member when the bus bar is clamped to the bracket. This rib structure is spaced from the longitudinally-spaced end surfaces of the bracket and clamping member by a substantial distance considered longitudinally of the bus bar so that there are present between the rib structure and said end surfaces shallow tunnels bounded by insulation and extending along the length of the bus bar adjacent said insulating coating.

8 Claims, 5 Drawing Figures

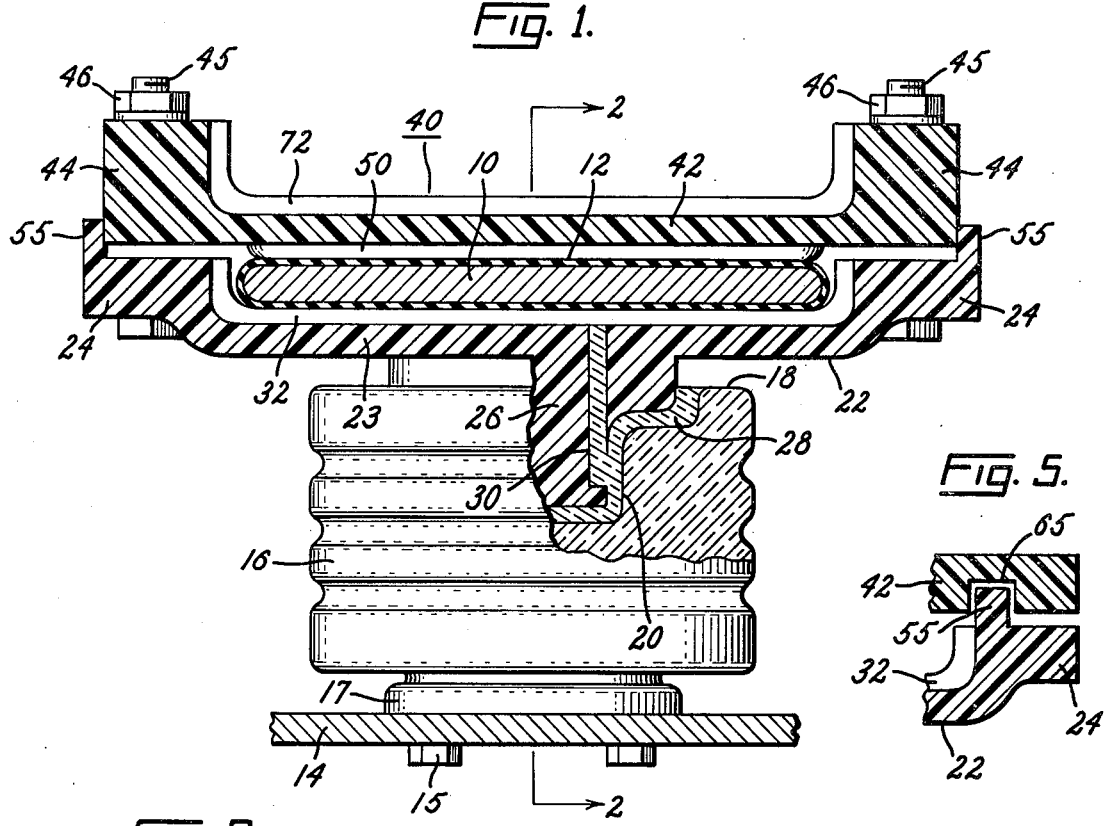
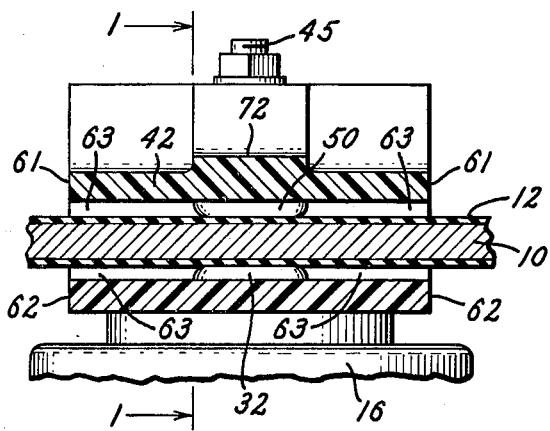
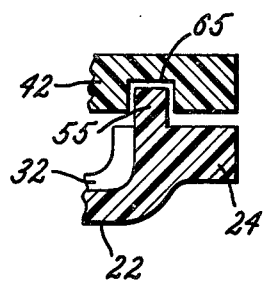
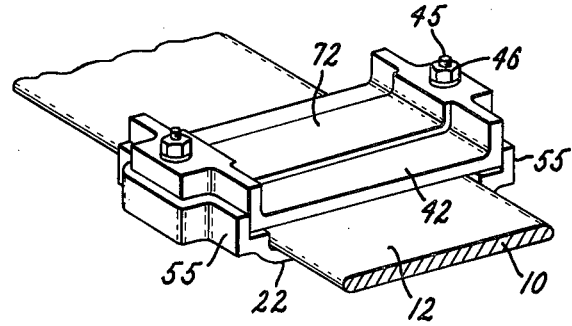
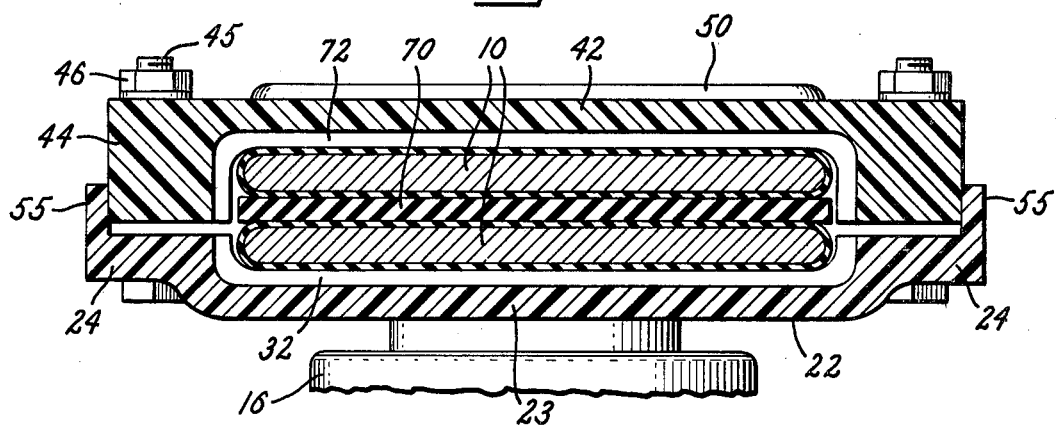

BUS STRUCTURE COMPRISING AN INSULATING SUPPORT AND A COATED ELECTRIC BUS BAR

BACKGROUND

This invention relates to bus structure comprising an insulating support and an electric bus bar mounted on the support and having all of its external surfaces in the region of the support covered with an unbroken insulating coating.

To permit a reduction in the electrical clearances between adjacent high voltage bus bars and also between the bus bars and ground, it is now common practice in certain applications, e.g., metal-clad switchgear rated at 13.8 kV, to provide the bus bars with a thin unbroken coating of insulation. While such an unbroken coating does permit some reductions in electrical clearance, the full reductions safely attainable with such unbroken insulating coatings typically have not been realized primarily because of the way in which the bus bars have been supported.

An insulating support that has permitted considerable reductions in electrical clearance as compared to those needed with a conventional porcelain insulator having metal end fittings is disclosed and claimed in U.S. Pat. No. 3,519,733-Eichelberger et al, assigned to the assignee of the present invention. This insulating support arrangement achieves this result primarily by providing attaching structure between the bus bar and the insulator that is free of metal parts and is effective without perforating the insulating coating.

While this general approach is quite effective and is one which we employ in our insulating support, we seek to obtain still further reductions in the required electrical clearances as compared to those needed with the Eichelberger et al and similar insulating structures. Our studies of this matter have shown that one obstacle to achieving such further reductions in required clearances is the ionization of critical air gaps between the coated conductor and the insulating support where they are in contact. Such ionization can trigger a damaging flashover of the insulating support. Unfortunately, it is extremely difficult, if not practically impossible, to eliminate all critical air gaps at the interface of the bus bar and the insulating support.

SUMMARY

An object of our invention is to construct the insulating support structure in such a manner that it has an exceptionally low tendency to flashover as a result of ionization of critical gaps between the coated bus bar and the insulating support structure.

Another object is to provide a bus bar and insulating support structure which is highly effective in suppressing the propagation of electrical discharge from the region of ionization at the critical gaps to the open air space surrounding the bus bar and the insulating support.

In carrying out the invention in one form, we provide a post-type insulator and a bus bar supported thereon having a coating of insulating material completely covering all external surfaces of the bus bar in the region of the insulator. A bracket of insulating material having a U-shaped cross-section is mounted on the insulator and has a bight portion extending across an end surface of the insulator and a pair of spaced-apart arms at opposite ends of the bight portion extending in a direction away from the insulator. The bus bar is clamped to the bracket in a position between said arms without perforating the insulating coating by clamping means comprising a clamping member of insulating material extending between the arms and attached thereto. The bracket and the clamping member each have rib structure projecting toward the bus bar and providing the sole surfaces through which contact is made between the coating on the bus bar and the bracket and clamping member when the bus bar is clamped to the bracket. This rib structure is spaced from each of the longitudinal ends of the bracket and clamping member by a substantial distance considered longitudinally of the bus so that there are present between said rib structure and said end surfaces shallow tunnels bounded by insulation extending along the length of the bus bar adjacent said insulating coating.

BRIEF DESCRIPTION OF DRAWINGS

For a better understanding of the invention, reference may be had to the following description taken in connection with the accompanying drawing, wherein:

FIG. 1 is a sectional view of bus structure embodying one form of the invention taken along the line 1—1 of FIG. 2.

FIG. 2 is a sectional view along the line 2—2 of FIG. 1.

FIG. 3 is a perspective view of the bus structure of FIGS. 1 and 2.

FIG. 4 is a sectional view similar to that of FIG. 1 showing a modified form of the invention.

FIG. 5 is a sectional view depicting another modified form of the invention.

DETAILED DESCRIPTION OF PREFERRED EMBODIMENTS

Referring now to FIG. 1, there is shown an electric bus bar 10 of conductive material that has all of its external surfaces completely covered with a coating 12 of insulating material. The bus bar is supported on a grounded metal housing 14 by support means including a post type porcelain insulator 16. Porcelain insulator 16 is suitably secured to the metal housing 14, as by means of screws 15 extending through the housing 14 and threaded into tapped holes in a metal end plate 17 on the lower end of the insulator.

Porcelain insulator 16 has a top surface 18 facing the bus bar 10 and a cavity 20 formed in the top surface. Mounted atop the insulator 16 is a U-shaped bracket 22 of insulating material. This bracket has a bight portion 23 extending across the top surface of the insulator 16 and a pair of arms 24 located at opposite ends of the bight portion and extending from the bight portion in a direction away from the insulator 16. Bracket 22 also includes a plug 26 integral therewith extending downwardly from the bight portion 23 and located in the cavity 20.

A suitable electrically non-conducting cement 28 fills the space between the plug and the cavity and is used for bonding the plug to the insulator. This cement is introduced into the cavity through spaced-apart holes 30 in the bracket which terminate short of the bottom of the plug. The presence of these holes 30 results in the plug having an irregular outer surface that coacts with the cement after it has hardened to provide an interlocking effect for strengthening the bond between the plug and the insulator.

The bus bar 10 is mounted on the bracket 22 in a position between the arms 24. Rib structure 32, formed integrally with both the bight portion 23 and the arms 24 of bracket 22, projects toward the bus bar 10, 12 and provides a seat on which the bus bar rests. The arms 24 are located closely adjacent the lateral edges of the bus bar so that the rib structure thereon engages the lateral edges of the bus bar and precludes any substantial lateral motion of the bus bar.

For clamping the bus bar 10, 12 against the rib structure 32 on the bight portion 23 of the bracket, a clamping arrangement 40 is provided. This clamping arrangement comprises a clamping member 42 of insulating material extending between the arms 24 of the bracket 22 across the bus bar 10, 12. Bolts 45 of insulating material, preferably glass fiber-reinforced plastic, provide a clamping force for holding the clamping member 42 against bracket 22. More specifically, each arm 24 contains a bolt hole registering with a bolt hole in a thickened marginal portion 44 of the clamping member 42, and a bolt 45 extends through these registering holes. An insulating nut 46 threaded on each bolt is tightened sufficiently to provide the necessary clamping force.

The clamping member 42 also includes rib structure (50) integral therewith and projecting toward the bus bar 10, 12. This rib structure 50 engages the upper surface of the bus bar 10, 12 when the clamping member 42 is in its normal clamping position of FIG. 1. The rib structures 32 and 50 are substantially aligned longitudinally of the bus bar and are located in a central position substantially midway between the longitudinal end surfaces of support structure 22, 42. The rib structures 32 and 50 provide the sole surfaces through which contact is made between the coating 12 and the bracket 22 and clamping member 42 when the bus bar is clamped to the bracket.

The U-shaped bracket 22 includes an upwardly projecting marginal lip 55 at each of its laterally-outermost edges. This lip overlaps and fits closely about the associated laterally-outermost periphery of the clamping member 42 and forms what amounts to a seal between the edges of parts 22 and 42 along this laterally-outermost periphery of the clamping member 42.

When the bus bar 10, 12 is energized with a high impulse voltage, e.g., the 95 kV impulse voltage typically used for testing 13.8 kV metal-clad switchgear, ionization of the critical air gaps between the bus bar 10, 12 and its supporting structure 22, 42 occurs. Instead of trying to eliminate these critical air gaps, which we find is extremely difficult, if not practically impossible, we located these critical air gaps in regions where their ionization has a much reduced tendency to trigger a flashover. More specifically, the critical air gaps in our structure are the tiny gaps that are inevitably present between the juxtaposed surfaces of the rib structure 32, 50 and the coating 12 on the bus bar 10. Although ionization occurs in these critical air gaps when the bus bar is energized with the above-described high impulse voltage, we severely inhibit growth of the resultant discharge and prevent it from significantly propagating into the open space outside the bus support. This result is accomplished partially as a result of the fact that the rib structure 32, 50, and hence the critical air gaps, are spaced from each of the longitudinal ends 61, 62 of the support structure 22, 42 by relatively large distances. There are, in effect, long shallow tunnels 63, bounded by insulation, extending along the length of the bus bar between the critical air gaps and the longitudinal ends 61 and 62 of the support structure. The discharge initiated at the critical air gaps is required to propagate itself through these tunnels in order to pass longitudinally of the bus bar into the surrounding open space where a flashover could develop. These long shallow tunnels 63 markedly inhibit this passage of the discharge. We believe there are several reasons for this. One is that each tunnel 63 is for the most part in an approximately equipotential region and, as a result, the electrostatic field does not provide strong assistance for growth of the discharge into flashover. Another is that the close proximity of dielectric surface all along the tunnel results in trapped charges being present along the tunnel surfaces, and this slows the growth of the discharge along the tunnels.

There is also some tendency for the discharge initiated at the critical gaps to pass laterally of the bus bar, but the effective seals provided along the lateral edges of the support structure by the lip 55 effectively suppress such lateral propagation.

FIG. 5 shows a modified type of sealing arrangement for suppressing lateral propagation of a discharge initiated at the critical air gaps. In this modified sealing arrangement, the overlapping lip 55 is spaced a short distance laterally inwardly of the lateral edge of the support structure and extends into a groove 65 in the clamping member 42. The lip 55 and the groove 65 run along the entire length of the support structure. A similar sealing arrangement is present at the opposite side of the bus bar 10. The sealing arrangement 55, 65 of FIG. 5 may be thought of as being located adjacent the laterally-outer edge of the support structure 22, 42.

In FIGS. 1–3 we have shown the insulating support being used for supporting a single-segment bus bar 10. In higher current applications, it may be desirable to use a bus bar comprising two such segments in parallel, and our support is readily adapted for such applications, as will be apparent from FIG. 4. The same major parts 22 and 42 are used in FIG. 4 as in FIG. 1, but the clamping member 42 is inverted. Between the two bus bar segments 10, an insulating spacer 70 having a dimension along the length of the bus bar equal to about that of the rib structure 32 is provided. When the clamping member 42 is forced toward the U-shaped support member 22 by the clamping bolts, a sandwich comprising the bus bar segments 10 and the spacer 70 is compressed between members 22 and 42. Contact between the members 22 and 42 and the bus bar is confined to the rib structure (32 and 72), just as in the embodiment of FIG. 1. Accordingly, this embodiment of FIG. 4 also has long, shallow tunnels (such as 63 in FIG. 2) bounded by insulating material between its rib structure 32, 72 and its longitudinal ends for inhibiting the propagation of discharge along the length of the bus. Also, the marginal lip 55 of FIG. 4 provides an effective seal against laterally-directed propagation of the discharge initiated at the critical gaps at the rib structure.

In a modified form of FIG. 4 (not shown), the spacer 70 has a dimension along the length of the bus bar slightly greater than that of the rib structure 72 and a notch at each of its laterally-opposed ends receiving the rib structure 72. This notch serves to locate the spacer 70 longitudinally of the bus bar in a desired position of alignment with respect to the rib structure.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. In electric bus structure:
   (a) a bus bar,
   (b) a post-type insulator supporting said bus bar and having an end surface facing said bus bar,
   (c) a coating of insulating material completely covering all external surfaces of said bus bar in the general region of said insulator,
   (d) a bracket of insulating material with a U-shaped cross-section mounted on said insulator and having a bight portion extending across said end surface and a pair of spaced-apart arms at opposite ends of said bight portion extending in a direction away from said insulator,
   (e) means clamping said bus bar to said bracket in a position between said arms without perforating said insulating coating comprising a clamping member of insulating material extending between said arms and attached thereto,
   (f) said bracket and said clamping member each having end surfaces located at points spaced apart along the length of said bus bar,
   (g) said bracket and said clamping member each having rib structure projecting toward said bus bar and providing the sole surfaces through which contact is made between the coating on said bus bar and the bracket and clamping member when the bus bar is clamped to said bracket,
   (h) said rib structure being spaced from each of said end surfaces by a substantial distance considered longitudinally of said bus bar so that there are present between said rib structure and said end surfaces shallow tunnels bounded by insulation and extending along the length of said bus bar adjacent said insulating coating.

2. The bus structure of claim 1 in which:
   (a) said bracket and said clamping member each has two laterally outer edges extending along the length of said bus bar at laterally opposed sides of said bus bar, and
   (b) sealing structure is provided adjacent said laterally outer edges for substantially preventing the passage of electrical discharge laterally of said bus bar between said clamping member and said bracket.

3. The bus structure of claim 1 in which:
   (a) said bracket and said clamping member each has two laterally outer edges extending along the length of said bus bar at laterally opposed sides of said bus bar, and
   (b) at each of said laterally outer edges, one of said bracket or said clamping member has structure thereon that overlaps the other to form an effective seal adjacent each of said edges for blocking the passage laterally of electrical discharge between said clamping member and said bracket.

4. The bus structure of claim 1 in which:
   (a) said bus bar comprises two bus bar segments, each being coated with insulating material in the region of said insulator,
   (b) said clamping member is a member of U-shaped cross-section having a bight portion and a pair of spaced-apart arms at opposite ends of said bight portion extending from said bight portion toward the arms on said bracket,
   (c) one of said bus bar segments is located between the arms on said clamping member, and
   (d) a spacer is interposed between said bus bar segments in a position spaced along the length of said bus bar conductor from said end surfaces of the bracket and clamping member.

5. The bus structure of claim 4 in which:
   (a) said bracket and said clamping member each has two laterally outer edges extending along the length of said bus bar at laterally opposed sides of said bus bar, and
   (b) sealing structure is provided adjacent said laterally outer edges for substantially preventing the passage of electrical discharge laterally of said bus bar between said clamping member and said bracket.

6. In electric bus structure:
   (a) a bus bar,
   (b) a post-type insulator supporting said bus bar and having an end surface facing said bus bar,
   (c) a coating of insulating material completely covering all external surfaces of said bus bar in the general region of said insulator,
   (d) a bracket member of insulating material mounted on said insulator and having a portion extending across said end surface,
   (e) means clamping said bus bar to said bracket member comprising a clamping member of insulating material extending laterally across said bus bar between laterally opposed ends of said bracket member,
   (f) one of said members being of U-shaped cross-section and comprising spaced arms at its lateral edges on laterally opposite sides of said bus bar extending toward said other member,
   (g) said bracket member and said clamping member each having end surfaces located at points spaced apart along the length of said bus bar,
   (h) said bracket member and said clamping member each having rib structure projecting toward said bus bar and providing the sole surfaces through which contact is made between the coating on said bus bar and the bracket member and clamping member when the bus bar is clamped to said bracket member,
   (i) said rib structure being spaced from each of said end surfaces by a substantial distance considered longitudinally of said bus bar so that there are present between said rib structure and said end surfaces shallow tunnels bounded by insulation and extending along the length of said bus bar adjacent said insulating coating.

7. The bus structure of claim 6 in which:
   (a) said bracket member and said clamping member each has two laterally outer edges extending along the length of said bus bar at laterally-opposed sides of said bus bar, and
   (b) sealing structure is provided adjacent said laterally outer edges for substantially preventing the passage of electrical discharge laterally of said bus bar between said clamping member and said bracket member.

8. The bus structure of claim 6 in which the rib structures on said bracket and clamping members are located substantially in alignment longitudinally of the bus bar and substantially midway between said end surfaces.

* * * * *